United States Patent
Morris

(10) Patent No.: US 7,085,455 B2
(45) Date of Patent: *Aug. 1, 2006

(54) CONDUIT INSERT FOR OPTICAL FIBER CABLE

(75) Inventor: David Drew Morris, Newnan, GA (US)

(73) Assignee: Milliken & Company, Spartanburg, SC (US)

( * ) Notice: Subject to any disclaimer, the term of this patent is extended or adjusted under 35 U.S.C. 154(b) by 37 days.

This patent is subject to a terminal disclaimer.

(21) Appl. No.: 10/625,008

(22) Filed: Jul. 23, 2003

(65) Prior Publication Data

US 2005/0047735 A1 Mar. 3, 2005

Related U.S. Application Data

(63) Continuation of application No. 10/354,869, filed on Jan. 30, 2003, now Pat. No. 6,671,440, which is a continuation of application No. 10/138,740, filed on May 2, 2002, now abandoned, which is a continuation of application No. 09/928,054, filed on Aug. 10, 2001, now Pat. No. 6,421,485, which is a continuation of application No. 09/400,778, filed on Sep. 22, 1999, now Pat. No. 6,304,698.

(51) Int. Cl.
*G02B 6/44* (2006.01)

(52) U.S. Cl. .................. 385/100; 385/109; 385/110; 385/112; 174/95; 174/97; 138/111; 138/118

(58) Field of Classification Search ............... 385/100, 385/101, 112, 105, 106, 109, 110; 174/95, 174/97, 99 R; 254/134, 134.3 R; 138/115–118, 138/111

See application file for complete search history.

(56) References Cited

U.S. PATENT DOCUMENTS

| 2,585,054 A | 2/1952 | Stachura ................. 174/36 |
| 2,742,388 A | 4/1956 | Russell ................. 154/110 |
| 3,032,151 A | 5/1962 | Allen et al. |
| 3,295,556 A | 1/1967 | Gertsma et al. |
| 3,524,921 A | 8/1970 | Wolf ................. 174/70 |
| 3,749,133 A | 7/1973 | Bochory ................. 138/119 |
| 3,830,067 A | 8/1974 | Osborn et al. ................. 61/12 |

(Continued)

FOREIGN PATENT DOCUMENTS

DE 32/17401 11/1983

(Continued)

OTHER PUBLICATIONS

U.S. Appl. No. 09/338,364, Allen.

*Primary Examiner*—Leonidas Boutsikaris
(74) *Attorney, Agent, or Firm*—Terry T. Moyer; Charlotte C. Wilson

(57) ABSTRACT

A flexible innerduct structure is configured to contain a cable within a conduit. The innerduct structure includes a pair of adjacent strip-shaped layers of flexible material that are joined along their longitudinal edges to define a channel through which the cable can extend longitudinally through the innerduct structure between the layers. The adjacent layers have differing widths between their longitudinal edges, whereby the wider layer bulges away from the narrower layer to impart an open configuration to the channel. Other features of the innerduct structure relate to the material of which it is formed. Such features includes the structure of the material, such as a woven structure, and further include properties such as melting point, tensile strength, elongation, coefficient of friction, crimp resistance and compression recovery.

94 Claims, 4 Drawing Sheets

U.S. PATENT DOCUMENTS

| | | | |
|---|---|---|---|
| 3,856,052 A | 12/1974 | Feucht | 138/119 |
| 3,911,200 A * | 10/1975 | Simons et al. | 174/36 |
| 3,939,875 A | 2/1976 | Osborn et al. | 138/178 |
| 3,996,968 A | 12/1976 | Bergman et al. | 138/118 |
| 4,281,211 A | 7/1981 | Tatum et al. | 174/36 |
| 4,282,284 A | 8/1981 | George | 428/251 |
| 4,478,661 A | 10/1984 | Lewis | 156/92 |
| 4,565,351 A | 1/1986 | Conti et al. | 254/134.3 |
| 4,582,093 A | 4/1986 | Hubbard et al. | 138/111 |
| 4,585,034 A | 4/1986 | Hubbard et al. | 138/111 |
| 4,619,291 A | 10/1986 | Shirian | 138/109 |
| 4,674,167 A | 6/1987 | Hubbard et al. | 29/401.1 |
| 4,707,074 A | 11/1987 | Heywood | 350/96.23 |
| 4,729,409 A | 3/1988 | Paul | 138/115 |
| 4,741,593 A | 5/1988 | Fochler | 350/96.23 |
| 4,745,238 A | 5/1988 | Kotthaus et al. | 174/101.5 |
| 4,761,194 A | 8/1988 | Pithouse et al. | 156/86 |
| 4,793,594 A | 12/1988 | Kumpf | 25/134.3 |
| 4,836,968 A | 6/1989 | Cakmakci | 264/177.19 |
| 4,862,922 A * | 9/1989 | Kite, III | 138/119 |
| 4,929,478 A * | 5/1990 | Conaghan et al. | 428/35.1 |
| 4,948,097 A | 8/1990 | Reeve et al. | 254/134.4 |
| 4,976,290 A | 12/1990 | Gelin et al. | 138/141 |
| 5,027,864 A * | 7/1991 | Conti et al. | 138/177 |
| 5,029,815 A | 7/1991 | Kumpf | 254/134.3 |
| 5,034,180 A | 7/1991 | Steketee, Jr. | 264/516 |
| 5,069,254 A | 12/1991 | Vogelsang | 138/111 |
| 5,074,527 A | 12/1991 | Kumpf | 254/134.3 |
| 5,163,481 A | 11/1992 | Catallo | 138/98 |
| 5,180,458 A | 1/1993 | White | 156/87 |
| 5,267,338 A | 11/1993 | Bullock et al. | 385/100 |
| 5,388,616 A | 2/1995 | Muller et al. | 138/98 |
| 5,391,838 A | 2/1995 | Plummer, III | 174/36 |
| 5,413,149 A * | 5/1995 | Ford et al. | 138/123 |
| 5,442,136 A * | 8/1995 | Allen | 174/95 |
| 5,503,695 A | 4/1996 | Imoto et al. | 156/71 |
| 5,536,461 A | 7/1996 | King et al. | 264/209.3 |
| 5,538,045 A | 7/1996 | Piotrowski et al. | 138/147 |
| 5,556,495 A | 9/1996 | Ford et al. | 156/148 |
| 5,563,975 A | 10/1996 | Gorian et al. | 385/100 |
| 5,587,115 A | 12/1996 | Allen | 264/1.24 |
| 5,601,671 A | 2/1997 | Speich | 156/88 |
| 5,698,056 A | 12/1997 | Kamiyama et al. | 156/218 |
| 5,789,711 A * | 8/1998 | Gaeris et al. | 174/113 C |
| 5,792,991 A | 8/1998 | Nolf | 174/92 |
| 5,822,485 A | 10/1998 | Nelson et al. | 385/112 |
| 5,908,049 A | 6/1999 | Williams et al. | 138/125 |
| 5,922,995 A | 7/1999 | Allen | 174/95 |
| 5,969,295 A * | 10/1999 | Boucino et al. | 174/113 C |
| 6,010,652 A | 1/2000 | Yoshida | |
| 6,059,264 A | 5/2000 | Kaminski et al. | 254/134.4 |
| 6,147,015 A | 11/2000 | Bureau | 442/29 |
| 6,178,278 B1 * | 1/2001 | Keller et al. | 385/109 |
| 6,179,269 B1 | 1/2001 | Kobylinski | 254/134.3 |
| 6,240,968 B1 | 6/2001 | Bigonzi-Jaker et al. | 138/115 |
| 6,246,820 B1 | 6/2001 | Le Cam et al. | 385/100 |
| 6,251,201 B1 | 6/2001 | Allen | 156/47 |
| 6,262,371 B1 | 7/2001 | Allen | 174/68.1 |
| 6,270,288 B1 | 8/2001 | Weidenheft, III et al. | 405/158 |
| 6,304,698 B1 * | 10/2001 | Morris | 385/100 |
| 6,398,190 B1 | 6/2002 | Li | 254/134.4 |
| 6,421,485 B1 | 7/2002 | Morris | 385/100 |
| 6,564,831 B1 | 5/2003 | Sanoner et al. | 138/115 |
| 6,571,833 B1 | 6/2003 | McLarty, III et al. | 138/116 |
| 2001/0046356 A1 | 11/2001 | Morris | |
| 2001/0046358 A1 | 11/2001 | Morris | 385/100 |
| 2002/0097966 A1 | 7/2002 | Zelesnik | 385/100 |
| 2002/0131735 A1 | 9/2002 | Morris | 385/100 |
| 2003/0010965 A1 | 1/2003 | Watanabe et al. | |
| 2003/0142933 A1 | 7/2003 | Morris | 385/100 |
| 2003/0185527 A1 | 10/2003 | Morris | 385/100 |

FOREIGN PATENT DOCUMENTS

| | | |
|---|---|---|
| EP | 0708287 | 10/1995 |
| EP | 0725466 | 1/1996 |
| WO | 00/79662 | 6/2000 |
| WO | 01/22142 | 3/2001 |

* cited by examiner

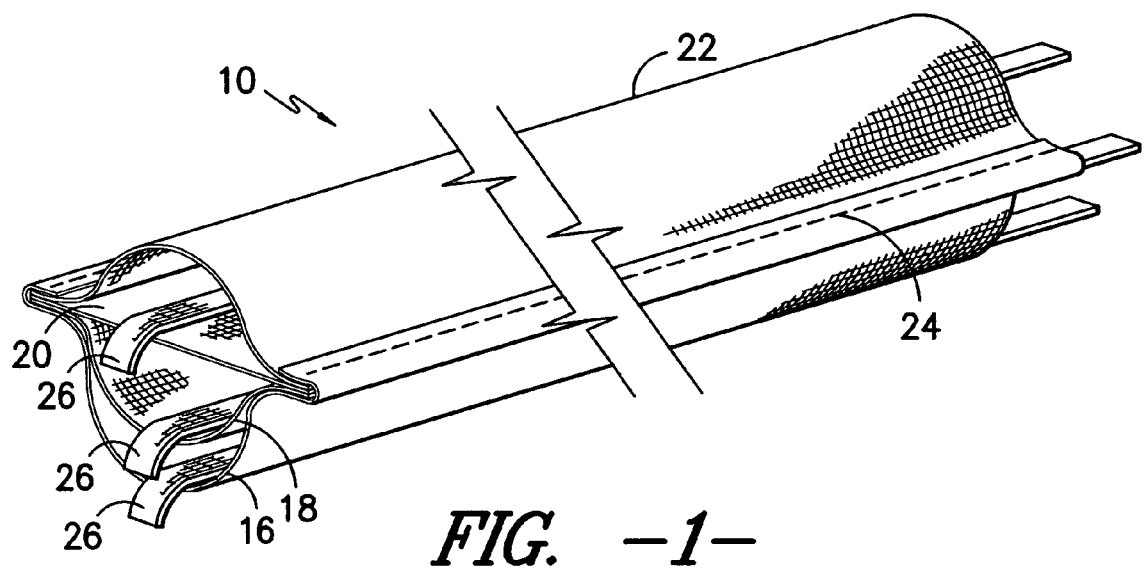
FIG. -1-
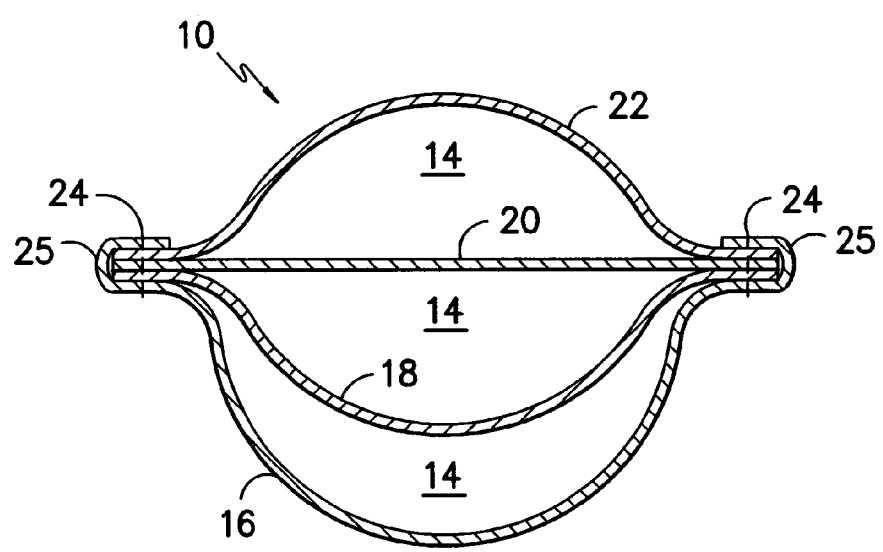
FIG. -2-

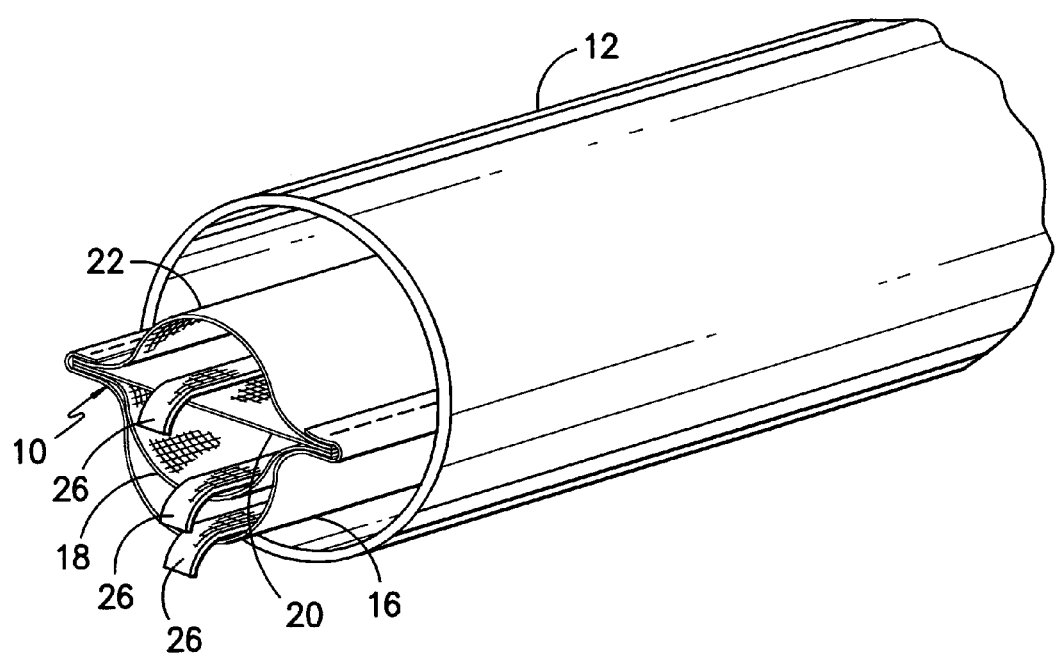
FIG. −3−

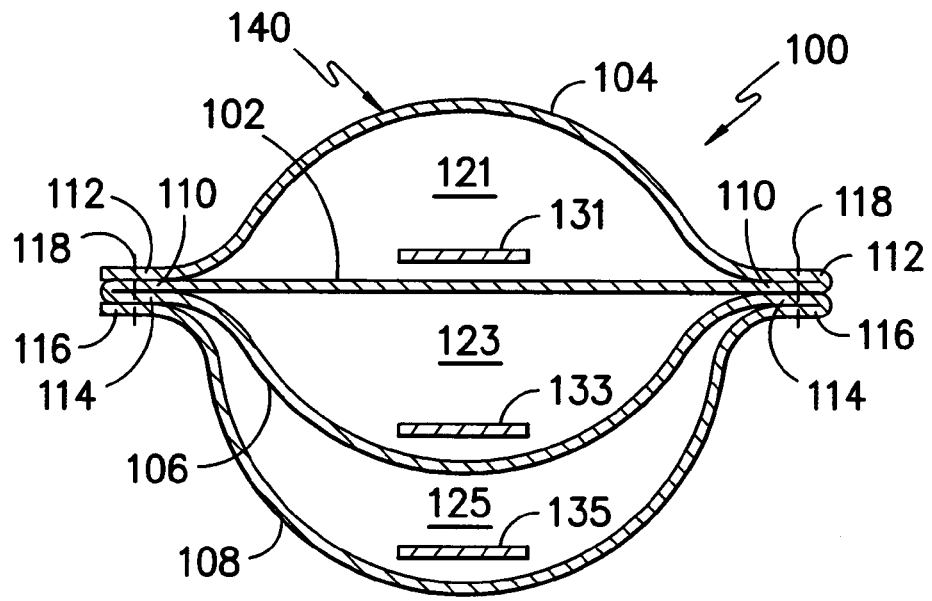
FIG. -4-
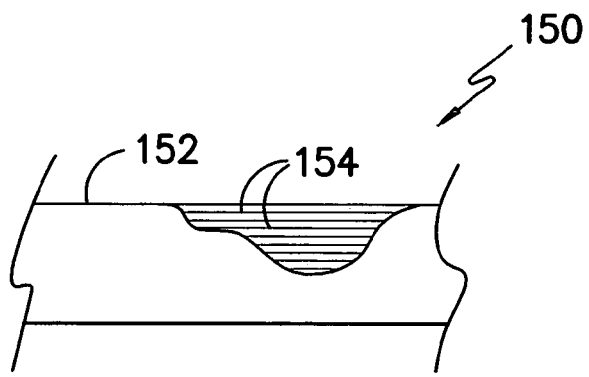
FIG. -5-
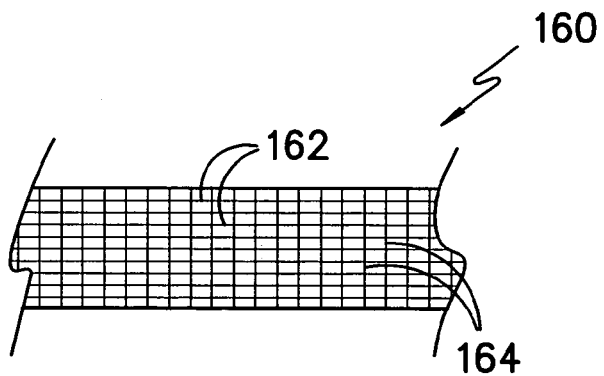
FIG. -6-

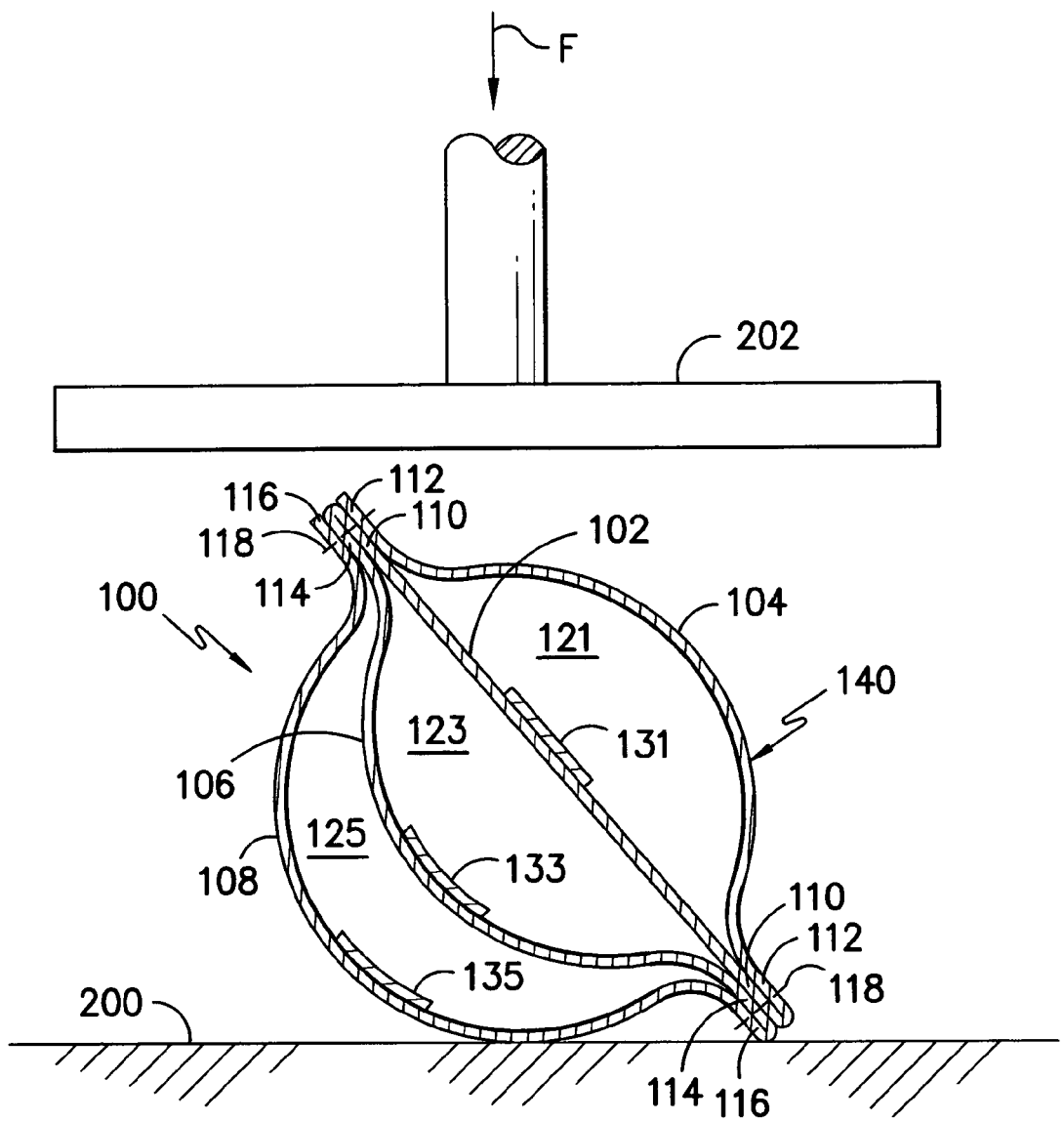
FIG. -7-
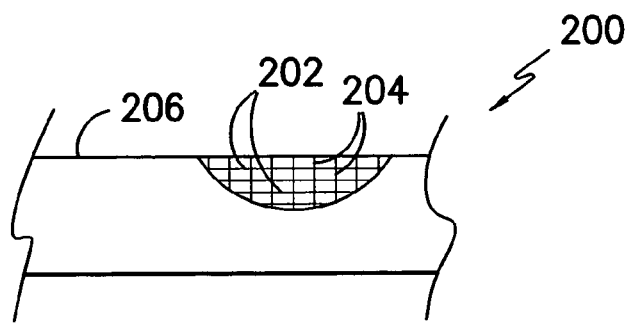
FIG. -8-

CONDUIT INSERT FOR OPTICAL FIBER CABLE

RELATED APPLICATIONS

This application is a continuation of copending U.S. patent application Ser. No. 10/354,869 filed on Jan. 30, 2003 now U.S. Pat. No. 6,671,440, which is a continuation of U.S. patent application Ser. No. 10/138,740, filed May 2, 2002 now abandoned, which is a continuation of U.S. patent application Ser. No. 09/928,054, filed Aug. 10, 2001, now issued U.S. Pat. No. 6,421,485, which is a continuation of U.S. patent application Ser. No. 09/400,778, filed Sep. 22, 1999, now issued U.S. Pat. No. 6,304,698.

BACKGROUND OF THE INVENTION

The present invention generally relates to tubular conduit of the type that might be employed for the housing of underground cables, such as fiber optic cable, coaxial cable, or the like. More particularly, the present invention relates to a partitioning device, which may be inserted into such a conduit such that the conduit is divided into separate areas. Specifically, the present invention is directed toward an elongated partitioning device which is flexible, such that it may be inserted into a conduit which is already in place, which may already have at least one cable positioned therein, and which may have turns, bends, or the like therein.

Cable, such as fiber optic communication cable, is often provided underground in great lengths, and may even extend for many miles. It is known in the art to bury the cable in the ground so that the area above ground is not cluttered with the cable and its respective support apparatus. Furthermore, by positioning the cable underground, it is more protected from the weather and other potentially damaging circumstances.

It is also known in the cable art to position the cable within a conduit in order to more fully protect the cable in the ground. The conduit is often formed from lengths of polyvinyl chloride tubing or the like, which is laid in the ground. A rope is then blown through the conduit, and the rope in turn is attached to one of the communication cables. By pulling the rope, the cable is drawn through the conduit. Once in place within the conduit, the cable is protected from damage which may be caused by weather, water and the like.

It has been found that certain rodents will sometimes gnaw through an underground conduit. Hence, much underground conduit is employed which has a diameter of two inches or more, which is large enough to impede damage from most rodents. While such conduit provides excellent protection for communication cable, there is also much unused or "dead" space within such a conduit. With the advent of fiber optic cables, which may be only a half-inch or less in diameter, there is even more dead space within an average conduit.

When a conduit is in place, it may be subsequently desired to run a second communications cable at the same location. As such, it would be desirable from a cost and time standpoint to make use of the dead space within an existing conduit, rather than lay a new length of conduit. However, it has been found that it is difficult to merely insert a second cable into a conduit which already contains a first cable. When a rope is blown into a conduit already containing a cable, or a second cable is "snaked" through the conduit, they are often impeded by the first cable, making it impossible to insert the second cable.

It has been suggested to provide a divider to be inserted into a conduit in order to separate the conduit into discrete sections, thus making insertion of the second cable easier. A problem has been encountered in that when conduit is placed over long distances, undulations will invariably occur therein. Also, planned curves, such as at underpasses or the like, will often be encountered rendering the placement of known dividers therein difficult, if not impossible.

A need exists therefore for a device to separate or partition a conduit, such as an underground communication cable conduit, into discrete sections. The device must be capable of being inserted into a conduit that is already in place, which may undulate over many miles, and which may have sharp turns therein. A need also exists for a partitioning device which will provide for improved use of the space within a conduit.

SUMMARY OF THE INVENTION

The present invention comprises a flexible innerduct structure configured to contain a cable within a conduit. The innerduct structure includes a pair of adjacent strip-shaped layers of flexible material that are joined along their longitudinal edges to define a channel through which the cable can extend longitudinally through the innerduct structure between the layers. In accordance with a principal feature of the invention, the adjacent layers have differing widths between their longitudinal edges, whereby the wider layer bulges away from the narrower layer to impart an open configuration to the channel.

Other principal features of the invention relate to the material of which the innerduct structure is formed. Such features include the structure of the material, such as a woven structure, and further include properties such as melting point, tensile strength, elongation, coefficient of friction, crimp resistance and compression recovery.

BRIEF DESCRIPTION OF THE DRAWINGS

The invention shall become apparent from the description which follows, in view of the drawings in which:

FIG. 1 is an isometric view of a conduit insert apparatus comprising a first embodiment of the present invention;

FIG. 2 is a cross-sectional view of the apparatus of FIG. 1;

FIG. 3 is an isometric showing the apparatus of FIG. 1 within a conduit;

FIG. 4 is a cross-sectional view of an apparatus comprising a second embodiment of the invention;

FIG. 5 is a partial view of an optical fiber cable used in accordance with the invention;

FIG. 6 is a schematic view of a strip of innerduct layer material constructed in accordance with the invention;

FIG. 7 schematically shows the apparatus of FIG. 4 on a test device; and

FIG. 8 is a schematic view of another strip of innerduct layer material constructed in accordance with the invention.

DESCRIPTION OF PREFERRED EMBODIMENTS

Referring now to the drawings, the reference number 10 represents an insert, which may be referred to as an innerduct, to be inserted in an optical fiber cable conduit 12. As shown in FIG. 3, a single innerduct 10 is shown in a conduit 12, but it should be understood that multiple innerducts like the innerduct 10 can be inserted in a conduit 12 depending on the diameter of the conduit 12. For example, it is contemplated that three such innerducts can be inserted in a 4" diameter conduit providing nine channels for the insertion of fiber optic cable.

Each innerduct 10 defines of a plurality of channels 14 which are formed by interconnected layers of fabric 16, 18, 20 and 22, etc. In the first embodiment of the invention each innerduct 10 has three channels 14 formed by the above noted layers 16, 18, 20 and 22 which are interconnected at their opposite longitudinal side edge portions by having the edge portions 25 of the lower layer 16 overlap the edge portions of the other layers and, by sewing 24 or other suitable methods such as ultrasonic welding, connecting the layers 16, 18, 20 and 22 together.

The fabric material preferably is soft and pliable, allowing the innerduct 10 to be pulled through the conduit 12 without snagging or generating too much heat and also is diverse enough so that the cable in one channel 14 does not contact the cable in the next adjacent channel 14. To this end the layers 16, 18, 20 and 22 in the first embodiment are 100% plain woven nylon fabrics having a 520 denier monofilament in both the warp and fill direction woven with a pick and end count of 38.5 which, when finished, has a 40×40 pick and end count. The fabric has a weight of 6.0 oz. yd. It is understood that the monofilament denier can vary from 200–1000 denier and the pick and end could well be altered to provide the desired cover to prevent contact of the fiber optic cables.

As stated above, the preferred yarn is 520 denier nylon 6 monofilament but another yarn, such as a 520 denier polyester, can be used so long as it has the desired characteristics.

The innerduct 10 is preferable constructed in the following manner. The fabric layers 16, 18, 20 and 22 are initially woven in long wide shapes and are cut along the warp direction into strips with the center strip 20 being the narrowest, the next adjacent strips 18 and 22 being wider, and the strip 16 being the widest so that when the strips 16–22 are mated and joined at their longitudinal edge portions the channels 14 will be formed by the bulging of the wider strips 16, 18 and 22. After the strips 16, 18, 20 and 22 have been cut they are laid in between each of the adjacent strips. Then the opposite longitudinal side edge portions 25 of the lower strip 16 are folded over those of the other strips and are sewn to form the innerduct 10 shown in FIG. 1.

The innerduct 10 is manufactured in long lengths for insertion in previously installed conduits 12. Each layer 16–22 is formed in a correspondingly long length by stitching or otherwise joining successive strips of the fabric material together end to end. Pull lines 26, which are preferably woven plastic tapes or plastic ropes, are tied to the optical fiber cables (not shown) at one end and are pulled through the channels 14 by grasping and pulling the lines 26 at the other end. The pull lines 26 are preferably placed over the layers 16, 18 and 20 before the layers 16–22 are overlapped and joined at their longitudinal edge portions.

As shown for example in FIG. 3, a single innerduct 10 is inserted in a conduit 12 having an inner diameter of 4". The strip-shaped fabric layer 20 is 3" wide, the layers 18 and 22 are 4" wide, and the layer 16 is 6" wide. The width of the narrowest layer is thus less than the inner diameter of the conduit 12. This helps to minimize frictional engagement of the innerduct 10 with the conduit 12 when the innerduct 10 is being pulled through the conduit 12.

The above described innerduct is readily manufactured and provides a structure which allows optical fiber cables to be pulled through without snagging or excessive heat build-up due to friction and does not allow contact or alternation losses between adjacent fiber optic cables in other channels of the insert.

A flexible innerduct structure 100 comprising a second embodiment of the invention is shown in FIG. 4. Like the innerduct structure 10 in the first embodiment, the innerduct structure 100 in the second embodiment comprises strip-shaped layers of flexible woven material 102, 104, 106 and 108 that are joined along their longitudinal edge portions 110, 112, 114 and 116, respectively, by stitching 118. Each pair of adjacent layers defines a respective cable channel 121, 123 or 125. In accordance with the invention, the layers in each pair have differing widths between their longitudinal edges such that the wider layer in the pair bulges away from the narrower layer. This imparts open configurations to the channels 121, 123 or 125.

As in the innerduct 10, the open configurations of the channels 121, 123 and 125 in the innerduct 100 facilitate insertion of cables longitudinally through the channels 121, 123 and 125 by the use of respective pull lines 131, 133 and 135. This is because the spacing between the layers 102–108 helps to prevent them from being pulled along with the cables, and thus helps to prevent bunching-up of the innerduct 100 within the conduit under the influence of the cable and pull lines 131–135 moving longitudinally through the channels 121, 123 and 125.

As described above, the cross section of the innerduct 10 is defined by separate strips of fabric material that are interconnected at their longitudinal edge portions to define overlying layers 16, 18, 20 and 22. As shown in FIG. 4, the overlying layers 102, 104, 106 and 108 of the innerduct 100 also are interconnected at their longitudinal edge portions, but are defined by folded sections of a single strip 140 of fabric material. Two, three, four (FIG. 2) or more strips could be used to define overlying layers in accordance with the invention. Each strip is one of a plurality of successive strips that are joined together end to end to provide the innerduct with a length that may extend, for example, from three to four miles.

FIG. 5 is a schematic partial view of an optical fiber cable 150 to be installed in an innerduct constructed in accordance with the invention. The cable 150 includes a plastic sheath 152 containing a bundle of optical fibers 154. Preferably, each layer of the innerduct that receives the cable 150 is formed of a flexible plastic material that is specified with reference to the plastic sheath 152 so as to have a melting temperature not lower than, and most preferably higher than, the melting temperature of the plastic sheathing material. This helps to ensure that sliding friction will not cause the cable 150 to burn through the innerduct when the cable 150 is being pulled longitudinally through the innerduct. In accordance with this feature of the invention, the innerduct layers are preferably formed of nylon 6 so as to have a melting temperature of about 220 degrees C.

The resistance to cable burn-through can also be specified with reference to a pull line duct cutting test substantially similar to the test known as the Bellcore pull line duct cutting test. In accordance with this feature of the invention, the innerduct layer material is preferably specified such that a 0.25 diameter polypropylene rope will not burn through a test sample of the innerduct structure when pulled through the test sample at 100 feet per minute and 450 pounds tension for at least 90 seconds.

The innerduct layer material may further be specified with reference to the material of which the pull lines are formed. In accordance with this feature of the invention, the layer material and the pull line material preferably have respective values of elongation percentage that are substantially equal for a given tensile load. If elongation of the innerduct differs substantially from that of a pull line, one of those structures may lag relative to the other when they are pulled together through a conduit in which they are to be installed together. The elongation percentages of the layer material and the pull line material are preferably not greater than about 75 percent at a peak tensile load, i.e., just prior to tensile failure, and are preferably within the range of about 15 to about 60 percent. A more preferred range extends from about 25 to about 40 percent. For example, nylon 6 is a preferred material and has an elongation of about 40 percent at a peak tensile load. Polyester is another preferred material and has an elongation of about 25 percent at a peak tensile load.

Other features of the invention relate to the tensile strength of the innerduct layer material. In an innerduct constructed in accordance with the invention, each layer preferably has a longitudinal tensile strength of at least about 12.5 pounds per inch of width. The longitudinal tensile strength of each layer may be within the range of about 12.5 to about 300 pounds per inch of width, and more preferably is within the range of about 50 to about 250 pounds per inch of width. However, the longitudinal tensile strength of each layer is most preferably within the range of about 100 to about 200 pounds per inch of width. For example, each layer 102, 104, 106 and 108 in the innerduct 100 may be formed of a woven fabric having both warp and fill yarns formed of nylon 6, with a longitudinal tensile strength of about 150 pounds per inch of width.

The interconnected layers should together provide the innerduct structure, as a whole, with a longitudinal tensile strength of at least about 90 pounds, but may provide a longitudinal tensile strength within the range of about 50 to about 5,000 pounds. A more preferred range is from about 125 to 4,500 pounds, and a range of about 1,250 to about 4,000 pounds is most preferable.

Additional features of the invention can be described with reference to FIG. 6. Specifically, FIG. 6 is a schematic view of a strip 160 of woven innerduct fabric material for use in accordance with the invention. The strip has warp yarns 162 extending along its length and has fill yarns 164 extending across its width. The fill yarns 164 are flexible but have a degree of rigidity or a resistance to crimping that helps the wider layers of the innerduct to retain their bulged condition relative to the adjacent narrower layers, as shown for example in FIG. 4, without being crimped or creased inward toward the adjacent narrower layers. Such crimping or creasing is of less concern in the longitudinal direction of the layers. Therefore, the warp yarns 162 of FIG. 6 may have a crimp resistance that is less than the crimp resistance of the fill yarns 164. Such is the case in the preferred embodiment of the strip 160 in which the warp yarns 162 are formed of polyester, which has a first crimp resistance, and the fill yarns 164 are formed of nylon 6, which has a second, greater crimp resistance. Polyester is preferably used for the warp yarns 162 so as to minimize the elongation differential with the pull lines, which also are preferably formed of polyester.

The crimp resistance can be expressed in terms of the crimp recovery angle. The crimp recovery angle is a measure of the degree to which a sample of the material returns toward a flat unfolded condition after having once been folded 180 degrees about a fold line in accordance with AATCC method 66. For example, a particular innerduct layer material constructed in accordance with the invention has heatset polyester warp yarns and nylon 6 fill yarns. That material was found to have a crimp recovery angle of 70 degrees in the warp direction and 135 degrees in the fill direction. A similar material with greige polyester rather than heatset polyester was found to have a crimp recovery angle of 50 degrees in the warp direction and 125 degrees in the fill direction. A material having heat set polyester yarns in both the warp and fill directions was found to have a crimp recovery angle of 90 degrees in the warp direction and 75 degrees in the fill direction. A similar material having only greige nylon yarns in both the warp and fill directions is found to have a crimp recovery angle 130 degrees in the warp direction and 120 degrees in the fill direction.

The innerduct layer material should be rigid enough to resist collapsing upon itself or bunching up under the influence of the pull lines and cables, but also should be flexible enough to be pulled easily through turns and undulation in the duct in which it is installed. The INDA IST90.3 test procedure is a method of determining the rigidity of the innerduct layer material. In this procedure, a test sample of flexible material is laid out over a slotted surface. A blade is then used to force the material through the slot. The results are expressed in terms of the applied force. In accordance with the invention, a strip of innerduct layer material extending longitudinally across the slot will be forced to bend along a transversely extending fold line. Such a strip will preferably have rigidity test results within the range of about 950 to about 1,750 grams. A strip of innerduct layer material extending transversely across the slot will be forced to bend about a longitudinally extending fold line, and will preferably have rigidity test results within the range of about 150 to about 750 grams. The strip of innerduct layer material will thus have a lesser rigidity across its width. The correspondingly greater degree of flexibility across its width helps to avoid creasing and thereby helps the wider layers of the innerduct to retain their bulged condition relative to the adjacent narrower layers, as described above with reference to FIG. 4. For example, the strip 160 (FIG. 6) of woven innerduct fabric material has fill yarns 164 that are formed of nylon 6. Such yarns are found to have rigidity test results within the range of about 350 to about 550 grams. The warp yarns 162 are formed of polyester. Such yarns are found to have rigidity test results within the range of about 1,250 to about 1,450 grams.

The coefficient of friction also can be specified for the innerduct layer material in accordance with the invention. In accordance with this feature of the invention, the innerduct layer material preferably has a dry static coefficient of friction, based on high density polyethylene on the material with a longitudinal line of action, within the range of about 0.010 to about 0.500. This range is more preferably from about 0.025 to about 0.250, and is preferably from about 0.035 to about 0.100. For example, a woven innerduct layer having polyester warp yarns and nylon 6 fill yarns was found to have a dry static coefficient of friction, based on high density polyethylene on the material with a longitudinal line of action, of 0.064. A similar material having heat set polyester warp yarns had a corresponding coefficient of friction of 0.073. A material having heat set polyester yarns in both the warp and fill directions had a corresponding coefficient of friction of 0.090, and a material having nylon 6 greige yarn in both the warp and fill directions had a corresponding coefficient of friction of 0.067. These coefficients of friction differed for transversely directed lines of action on the four foregoing materials and were, respectively, 0.085, 0.088, 0.110, and 0.110. The dynamic or sliding coefficients of friction for these materials, again based on high density polyethylene on the material with a longitudinal line of action, were found to be 0.063, 0.56, 0.058, and 0.049, respectively. The transverse counterparts to these dynamic values were 0.064, 0.067, 0.078, and 0.075, respectively. Although these tested values of sliding coefficient of friction are most preferred, the invention comprises broader ranges such as the range from about 0.0050 to about 0.1250, as well as an intermediate range of about 0.0075 to about 0.0625, and a narrower range of about 0.0100 to about 0.0250.

Additional features of the invention relate to the open configurations of the channels in the innerduct structures. Preferably, in addition to the differing widths of the adjacent layers, the invention further comprises a material property of the layers that contributes to the open configurations of the channels defined by and between the layers. This material property of the layers is a spring-like resilience that enables the innerduct structure to maintain a freestanding condition such as, for example, the condition in which the innerduct structure 100 is shown in FIG. 7. When the innerduct 100 is fully flattened against the surface 200 by an actuator 202 under the influence of an applied test force F, it will preferably rebound fully or substantially fully to its original freestanding condition as the force F is relieved upon retraction of the actuator 202. By "fully flattened" it is meant that the wider layers 104, 106 and 108 are deflected toward and against the narrowest layer 102 until the applied test force F reaches a peak level at which no further compression will occur without damage to the innerduct 100. This fully flattened condition will include folds between overlapping plies of the wider layers 104, 106 and 108. Preferably, the innerduct 100, or another innerduct constructed in accordance with the invention, will not undergo a next subsequent compression in the same manner under the influence of a peak applied test force that is less than about 85 to 100 percent of the previous peak applied test force. This indicates the correspondingly high degree to which the innerduct tends to retain an open configuration for passage of cables through the cable channels.

FIG. 8 is a view similar to FIG. 6 showing an alternative strip 200 of innerduct layer material constructed in accordance with the present invention. Like the strip 160 shown in FIG. 6, the strip 200 comprises a woven structure having warp yarns 202 and fill yarns 204. The strip 200 further comprises a barrier 206 that blocks air from flowing through the strip 200 between the warp yarns 202 and the fill yarns 204. Such impervious strips enable a cable to be blown through the innerduct structure without a loss of pneumatic pressure that could otherwise result from the passage of air outward through layers.

Impervious strips could be used to define all of the layers of the innerduct structure, but would more preferably be used to define the outermost layers of the innerduct structure. For example, a pair of strips like the strip 200 could be used to define the outermost layers 16 and 22 of the innerduct structure 10 described above. A single strip like the strip 200 could be used to define all of the layers 102–108 of the innerduct structure 100 described above. In the embodiment shown in FIG. 8, the barrier 206 is a thin layer of plastic material that is bonded to the yarns 202 and 204 in a heat lamination process. If a plastic air barrier like the layer 206 is included in the innerduct structure at a location facing inward of a cable channel, it is preferably formed of a plastic material having a melting temperature that is not less than the melting temperature of the plastic sheathing material on the cable that is to be blown through the channel.

The invention has been described with reference to preferred embodiments. Those skilled in the art will perceive improvements, changes and modifications. Such improvements, changes and modifications are intended to be within the scope of the claims.

The invention claimed is:

1. Apparatus comprising:
   a flexible structure configured to enclose and carry at least one cable, said structure comprising textile material formed in such a way as to define at least one longitudinal channel configured to enclose and carry a cable;
   said textile material having warp yarns comprising polyester and having fill yarns comprising nylon; and
   means for pulling a cable into said structure,
   wherein said structure is disposed within a conduit.

2. The apparatus set forth in claim 1, wherein said pulling means extends longitudinally through said channel, and is selected from the group consisting of tape or rope.

3. The apparatus set forth in claim 2, wherein said textile material and said pull tape or rope have respective values of elongation percentage that are substantially equal for a given tensile load.

4. The apparatus set forth in claim 1, wherein said textile material is a woven fabric.

5. The apparatus set forth in claim 1, wherein said yarns have a denier in the range of 200–1000 denier.

6. The apparatus set forth in claim 1, wherein said structure is formed from a single sheet of said textile material.

7. The apparatus set forth in claim 1, wherein said structure is resiliently biased toward an open channel configuration and is also readily collapsible in a transverse direction.

8. The apparatus set forth in claim 1, wherein a cable is disposed within said structure.

9. Apparatus comprising:
   a conduit;
   a flexible structure disposed within said conduit;
   said flexible structure configured to enclose and carry at least one cable, said structure comprising woven textile material formed in such a way as to define at least one longitudinal channel configured to enclose and carry a cable;
   said textile material having warp yarns formed of polyester having a denier in the range of 200 to 1000 denier;
   said textile material having fill yarns formed of nylon having a denier in the range of 200 to 1000 denier; and
   means for pulling a cable into said structure.

10. The apparatus set forth in claim 9, wherein said flexible structure is formed from a single sheet of woven textile material.

11. The apparatus set forth in claim 9, wherein said pulling means extends longitudinally through said channel, and is selected from the group consisting of tape or rope.

12. The apparatus set forth in claim 11, wherein said woven textile material and said pull tape or rope have respective values of elongation percentage that are substantially equal for a given tensile load.

13. The apparatus set forth in claim 9, wherein said structure is resiliently biased toward an open channel configuration and is also readily collapsible in a transverse direction.

14. Apparatus comprising:
   a flexible structure configured to enclose and carry at least one cable, said structure comprising a single sheet of textile material formed in such a way as to define at least one longitudinal channel;
   wherein said single sheet of textile material is joined so that one longitudinal edge of said textile material is folded over a second longitudinal edge of said textile material and attached thereto, and wherein a cable extends longitudinally through said channel, said cable having an outer sheath that has a first melting temperature and said textile material having a second melting temperature not lower than said first melting temperature.

15. The apparatus set forth in claim 14, further including means for pulling a cable into said structure.

16. The apparatus set forth in claim 15, wherein said pulling means is selected from the group consisting of tape or rope.

17. The apparatus set forth in claim 16, wherein said textile material and said pull tape or rope have respective values of elongation percentage that are substantially equal for a given tensile load.

18. The apparatus set forth in claim 14, wherein said textile material is a woven fabric.

19. The apparatus set forth in claim 14, wherein said textile material includes yarns have a denier in the range of 200–1000 denier.

20. The apparatus set forth in claim 14, wherein said textile material includes polyester and nylon yarns.

21. The apparatus set forth in claim 14, wherein said structure is resiliently biased toward an open channel configuration and is also readily collapsible in a transverse direction.

22. The apparatus set forth in claim 14, wherein said structure is disposed within a conduit.

23. The apparatus set forth in claim 18, wherein a cable is disposed within said structure.

24. The apparatus set forth in claim 14, wherein said textile material has a melting temperature of at least about 220 degrees C.

25. The apparatus set forth in claim 18, wherein said woven textile material includes monofilament yarns.

26. The apparatus set forth in claim 25, wherein said monofilament yarns have a denier in the range of 200–1000 denier.

27. The apparatus set forth in claim 14, wherein said textile material has a transversely directed crimp resistance recovery angle within a range of about 50 degrees to about 130 degrees.

28. The apparatus set forth in claim 14, wherein said textile material is a fabric made from yarns selected from the group consisting of polyester, nylon and combinations thereof.

29. The apparatus set forth in claim 28, wherein said fabric comprises warp yarns formed of polyester and having fill yarns formed of nylon.

30. The apparatus set forth in claim 14, wherein said textile material exhibits a longitudinal tensile strength of at least about 12.5 pounds per inch of width.

31. The apparatus set forth in claim 14, wherein said textile material has a longitudinal tensile strength within the range of about 12.5 pounds per inch of width to about 300 pounds per inch of width.

32. The apparatus set forth in claim 14, wherein said textile material exhibits an elongation percentage of not greater than about 75 percent at a peak tensile load.

33. The apparatus set forth in claim 32, wherein said textile material exhibits an elongation percentage of not greater than about 40 percent at a peak tensile load.

34. The apparatus set forth in claim 33, wherein said textile material exhibits an elongation percentage of not greater than about 25 percent at peak tensile load.

35. The apparatus set forth in claim 14, wherein said textile material has a coefficient of friction, based on high density polyethylene on said material with a longitudinal line of action, below about 0.1250.

36. The apparatus set forth in claim 14, wherein said textile material is selected so that a 0.25 inch diameter polypropylene rope will not burn through a test sample of said structure when pulled through said test sample in a pull line duct cutting test at 100 feet per minute and 450 pounds tension for at least 90 seconds.

37. Apparatus comprising:
a flexible insert for cable conduits made of a flexible woven material formed in such a way as to define at least one longitudinal channel, said flexible material having warp yarns and fill yarns, said warp yarns being comprised of polyester;

wherein said flexible material exhibits elongation of not more than 40 percent at peak tensile load; and wherein said flexible material has a longitudinal tensile strength of at least about 12.5 pounds per inch of width.

38. The apparatus set forth in claim 37, further comprising means for pulling a cable into said insert.

39. The apparatus set forth in claim 38, wherein said pulling means is selected from the group consisting of tape or rope.

40. The apparatus set forth in claim 37, wherein said flexible material has a melting temperature of at least about 220 degrees C.

41. The apparatus set forth in claim 37, wherein said woven fabric includes monofilament yarns.

42. The apparatus set forth in claim 41, wherein said monofilament yarns have a denier in the range of 200–1000 denier.

43. The apparatus set forth in claim 37, wherein a cable extends longitudinally through said channel, said cable having an outer sheath that has a first melting temperature, and said flexible material having a second melting temperature not lower than said first melting temperature.

44. The apparatus set forth in claim 37, wherein said flexible material is formed in such a way as to define at least two longitudinal channels, each configured to enclose and carry a cable.

45. The apparatus set forth in claim 37, wherein said flexible material has a transversely directed crimp resistance recovery angle within a range of about 50 degrees to about 130 degrees.

46. The apparatus set forth in claim 37, wherein said flexible material is a fabric having warp yarns comprising polyester and having fill yarns comprising nylon.

47. The apparatus set forth in claim 37, wherein said flexible material exhibits an elongation percentage of not greater than about 75 percent at a peak tensile load.

48. The apparatus set forth in claim 37, wherein said structure is resiliently biased toward an open channel configuration and is also readily collapsible in a transverse direction.

49. The apparatus set forth in claim 37, wherein said flexible material has a coefficient of friction, based on high density polyethylene on said material with a longitudinal line of action, below about 0.1250.

50. The apparatus set forth in claim 37, wherein said flexible material is selected so that a 0.25 inch diameter polypropylene rope will not burn through a test sample of said structure when pulled through said test sample in a pull line duct cutting test at 100 feet per minute and 450 pounds tension for at least 90 seconds.

51. A method for dividing a conduit into multiple channels, said method comprising the steps of:
forming a flexible material by weaving monofilament yarns together to form a woven textile fabric, wherein said flexible material has warn yarns comprised of polyester and fill yarns comprised of nylon;
creating an innerduct structure formed from said flexible material in such a way as to define at least one longitudinal channel;
blowing said innerduct structure into a conduit using pneumatic pressure; and
positioning a cable within said innerduct structure.

52. The method set forth in claim 51, wherein said flexible material is impervious to air.

53. The method set forth in claim 51, wherein said cable includes a sheathing material having a first melting temperature, and wherein said flexible material has a second melting temperature not lower than said first melting temperature.

54. The method set forth in claim 51, wherein said positioning step includes using a pull tape or pull rope attached to said cable to pull said cable into said innerduct structure.

55. The method set forth in claim 51, including the step of forming said innerduct structure from a single sheet of said flexible material.

56. The method set forth in claim 51, wherein said monofilament yarns have a denier in the range of 200–1000 denier.

57. A method for dividing a conduit into multiple channels, said method comprising the steps of:
forming a flexible material by weaving monofilament yarns together to form a woven textile fabric, wherein said flexible material has warp yarns comprised of polyester and fill yarns comprised of nylon, said flexible material having an impervious barrier layer to prevent air from flowing through said flexible material;
creating an innerduct structure formed from said flexible material in such a way as to define at least one longitudinal channel;
blowing said innerduct structure into a conduit using pneumatic pressure; and
positioning a cable within said innerduct structure.

58. A method of dividing a longitudinally extending conduit, said method comprising the steps of:
forming a flexible material by weaving monofilament yarns together to form a woven textile fabric, wherein said flexible material has warn yarns comprised of polyester and fill yarns comprised of nylon;
creating at least one flexible innerduct structure made from a single sheet of said flexible material, said innerduct structure being configured to enclose and carry at least one cable;
inserting said at least one flexible innerduct structure into a conduit; and
inserting at least one cable into said flexible innerduct structure.

59. The method set forth in claim 58, further comprising the step of inserting a plurality of flexible innerduct structures into said conduit.

60. The method set forth in claim 58, further comprising the step of providing means for pulling said cable into said flexible innerduct structure.

61. The method set forth in claim 60, wherein said means for pulling said cable into said flexible innerduct structure is selected from the group consisting of tape or rope.

62. The method set forth in claim 58, wherein said flexible innerduct structure includes a plurality of longitudinal channels.

63. The method set forth in claim 58, wherein said monofilament yarns have a denier in the range of 200–1000 denier.

64. The method set forth in claim 58, further including the step of forming said flexible innerduct structure to be resiliently biased toward an open position, and which may be readily flattened.

65. The method set forth in claim 58, further including the step of selecting said flexible material so that it has a higher melting temperature than any sheathing disposed on an outer portion of said cable.

66. The method set forth in claim 58, wherein said step of inserting said flexible innerduct into said conduct includes the step of using pneumatic pressure to blow said flexible innerduct into said conduit.

67. The method set forth in claim 58, wherein said flexible material exhibits an elongation percentage of not greater than about 75 percent at a peak tensile load.

68. The method set forth in claim 58, wherein said flexible material exhibits an elongation percentage of not greater than about 40 percent at peak tensile load.

69. The method set forth in claim 58, wherein said flexible material exhibits an elongation percentage of not greater than about 25 percent at peak tensile load.

70. The method set forth in claim 58, wherein said flexible material has a transversely directed crimp resistance recovery angle within a range of about 50 degrees to about 130 degrees.

71. The method set forth in claim 58, wherein said flexible material is a flexible woven fabric comprising warp yarns that together provide said woven fabric with a first crimp recovery angle and fill yarns that together provide said woven fabric with a second, greater crimp recovery angle.

72. The method set forth in claim 58, wherein said flexible material is selected so that a 0.25 inch diameter polypropylene rope will not burn through a test sample of said flexible innerduct when pulled through said test sample in a pull line duct cutting test at 100 feet per minute and 450 pounds tension for at least 90 seconds.

73. The method set forth in claim 58, wherein said flexible material has a melting temperature of at least about 220 degrees C.

74. The method set forth in claim 58, wherein said flexible material has a coefficient of friction, based on high density polyethylene on said material with a longitudinal line of action, below about 0.1250.

75. A cable receiving assembly comprising:
a tubular conduit having an internal area for the housing of cables;
a flexible elongated partitioning device disposed longitudinally within the internal area of the tubular conduit, the flexible elongated partitioning device including:
a woven innerduct having a single strip of fabric material interconnected to itself so as to form at least one channel, the single strip of fabric material having monofilament polyester warp yarns running in the longitudinal direction of the flexible elongated partitioning device; and,
a pull line disposed in the at least one channel of the woven innerduct.

76. The cable receiving assembly of claim 75, wherein the monofilament polyester warp yarns are heat set.

77. The cable receiving assembly of claim 75, wherein the single strip of fabric material further includes polyester fill yarns, and wherein the warp and the fill yarns are heat set.

78. The cable receiving assembly of claim 75, wherein the monofilament polyester warp yarns have a denier from 200 to 1000 denier.

79. The cable receiving assembly of claim 75, wherein the woven innerduct has a bias for remaining open.

80. The cable receiving assembly of claim 75, wherein the single strip of fabric material further includes fill yarns, and wherein the warp yarns have a crimp resistance that is less than that of the fill yarns.

81. The cable receiving assembly of claim 75, wherein the single strip of fabric material further includes monofilament nylon fill yarns.

82. The cable receiving assembly of claim 75, wherein the single strip of fabric material of the woven innerduct is interconnected to itself so as to form a plurality of channels.

83. The cable receiving assembly of claim 82, wherein the flexible elongation partitioning device further includes a pull line in each of the plurality of channels in the woven innerduct.

84. The cable receiving assembly of claim 75, wherein the fabric material of the woven innerduct and the pull line have respective values of elongation percentage that are substantially equal for a given tensile load.

85. A cable assembly comprising:
  a tubular conduit having an internal area for the housing of cables;
  a woven innerduct disposed longitudinally within the internal area of the tubular conduit, the woven innerduct having a single strip of fabric material interconnected to itself so as to form at least one channel, the single strip of fabric material having monofilament polyester warp yarns running in the longitudinal direction of the woven innerduct; and,
  a cable disposed longitudinally within the at least one channel of the woven innerduct.

86. The cable receiving assembly of claim 85, wherein the monofilament polyester warp yarns are heat set.

87. The cable receiving assembly of claim 85, wherein the single strip of fabric material further includes polyester fill yarns, and wherein the warp and the fill yarns are heat set.

88. The cable receiving assembly of claim 85, wherein the monofilament polyester warp yarns have a denier from 200 to 1000 denier.

89. The cable receiving assembly of claim 85, wherein the woven innerduct has a bias for remaining open.

90. The cable receiving assembly of claim 85, wherein the single strip of fabric material further includes fill yarns, and wherein the warp yarns have a crimp resistance that is less than that of the fill yarns.

91. The cable receiving assembly of claim 85, wherein the single strip of fabric material further includes monofilament nylon fill yarns.

92. The cable receiving assembly of claim 85, wherein the single strip of fabric material of the woven innerduct is interconnected to itself so as to form a plurality of channels.

93. The cable receiving assembly of claim 92, wherein the woven innerduct further includes a cable in each of the plurality of channels.

94. The cable receiving assembly of claim 85, wherein the cable includes a sheath and wherein the fabric material of the woven innerduct has a melting point not lower than the melting point of the sheath of the cable.

* * * * *

UNITED STATES PATENT AND TRADEMARK OFFICE
CERTIFICATE OF CORRECTION

PATENT NO. : 7,085,455 B2
APPLICATION NO. : 10/625008
DATED : August 1, 2006
INVENTOR(S) : David D. Morris It is certified that error appears in the above-identified patent and that said Letters Patent is hereby corrected as shown below:

Column 11 - Claim 51, line 5 "warn" should be --warp--

Column 11- Claim 58, line 49 "warn" should be --warp--

Column 12 - Claim 66, line 2 "conduct" should be --conduit--

Signed and Sealed this

Twenty-eighth Day of November, 2006

JON W. DUDAS
*Director of the United States Patent and Trademark Office*